US008509426B1

(12) United States Patent
Ghouti et al.

(10) Patent No.: US 8,509,426 B1
(45) Date of Patent: Aug. 13, 2013

(54) XZ-ELLIPTIC CURVE CRYPTOGRAPHY SYSTEM AND METHOD

(75) Inventors: Lahouari Ghouti, Dhahran (SA); Mohammad K. Ibrahim, Leicester (GB); Abdulaziz M. Al-Khoraidly, Onaizah (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 456 days.

(21) Appl. No.: 12/958,273

(22) Filed: Dec. 1, 2010

(51) Int. Cl.
*H04L 9/06* (2006.01)

(52) U.S. Cl.
USPC .................. 380/28; 380/30; 380/44; 380/259

(58) Field of Classification Search
USPC ........................................ 380/28, 30, 44, 259
See application file for complete search history.

(56) References Cited

U.S. PATENT DOCUMENTS

| | | | |
|---|---|---|---|
| 4,200,770 A | 4/1980 | Hellman et al. | |
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 5,627,893 A * | 5/1997 | Demytko | 380/30 |
| 6,816,594 B1 | 11/2004 | Okeya | |
| 6,876,745 B1 | 4/2005 | Kurumatani | |
| 7,162,033 B1 | 1/2007 | Coron | |
| 7,308,469 B2 | 12/2007 | Harley et al. | |
| 7,319,751 B2 | 1/2008 | Kirichenko | |
| 7,483,533 B2 | 1/2009 | Ibrahim | |
| 7,483,534 B2 | 1/2009 | Ibrahim | |
| 2003/0072443 A1 | 4/2003 | Harley et al. | |
| 2003/0108196 A1 | 6/2003 | Kirichenko | |
| 2004/0091105 A1 | 5/2004 | Kim et al. | |
| 2004/0114756 A1 | 6/2004 | Moller et al. | |
| 2004/0223609 A1 | 11/2004 | Wu | |
| 2004/0228478 A1 | 11/2004 | Joye | |
| 2004/0247114 A1 | 12/2004 | Joye | |

(Continued)

FOREIGN PATENT DOCUMENTS

| | | |
|---|---|---|
| EP | 0874307 | 10/1998 |
| EP | 0892520 | 1/1999 |
| EP | 1215642 | 6/2002 |
| WO | WO9904332 | 1/1999 |

OTHER PUBLICATIONS

Coron Jean, Resistance Against Differential Power Analysis for Elliptic Curve Cryptosystems, 1999, C.K. Koc and C. Paar, Eds, vol. 1717 of Lecture Notes in Computer Science, pp. 292-302.*

(Continued)

*Primary Examiner* — Jeffrey Pwu
*Assistant Examiner* — Samuel Ambaye
(74) *Attorney, Agent, or Firm* — Richard C. Litman

(57) ABSTRACT

The XZ-elliptic curve cryptography system and method provides a computerized method that allows for the encryption of messages through elliptic polynomial cryptography and, particularly, with the embedding of either a symmetric secret key or a public key in the message bit string. The method of performing XZ-elliptic polynomial cryptography is based on the elliptic polynomial discrete logarithm problem. It is well known that an elliptic polynomial discrete logarithm problem is a computationally "difficult" or "hard" problem.

13 Claims, 1 Drawing Sheet

(56) References Cited

U.S. PATENT DOCUMENTS

| | | |
|---|---|---|
| 2006/0029220 A1 | 2/2006 | Ibrahim |
| 2006/0029221 A1 | 2/2006 | Ibrahim |
| 2008/0080710 A1 | 4/2008 | Harley et al. |
| 2008/0215658 A1 | 9/2008 | Gura et al. |
| 2008/0260143 A1* | 10/2008 | Ibrahim ............ 380/28 |
| 2009/0136022 A1 | 5/2009 | Langendoerfer et al. |

OTHER PUBLICATIONS

Izu et al., A Fast Parallel Elliptic Curve Multiplication Resistant against Side Channel Attacks, 2002, Fujitsu Laboratories Ltd., pp. 280-296.*

Joyce et al., Protections against Differential Analysis for Elliptic Curve Cryptography, 2001, Gemplus Card International, Card Security Group, pp. 377-390.*

* cited by examiner

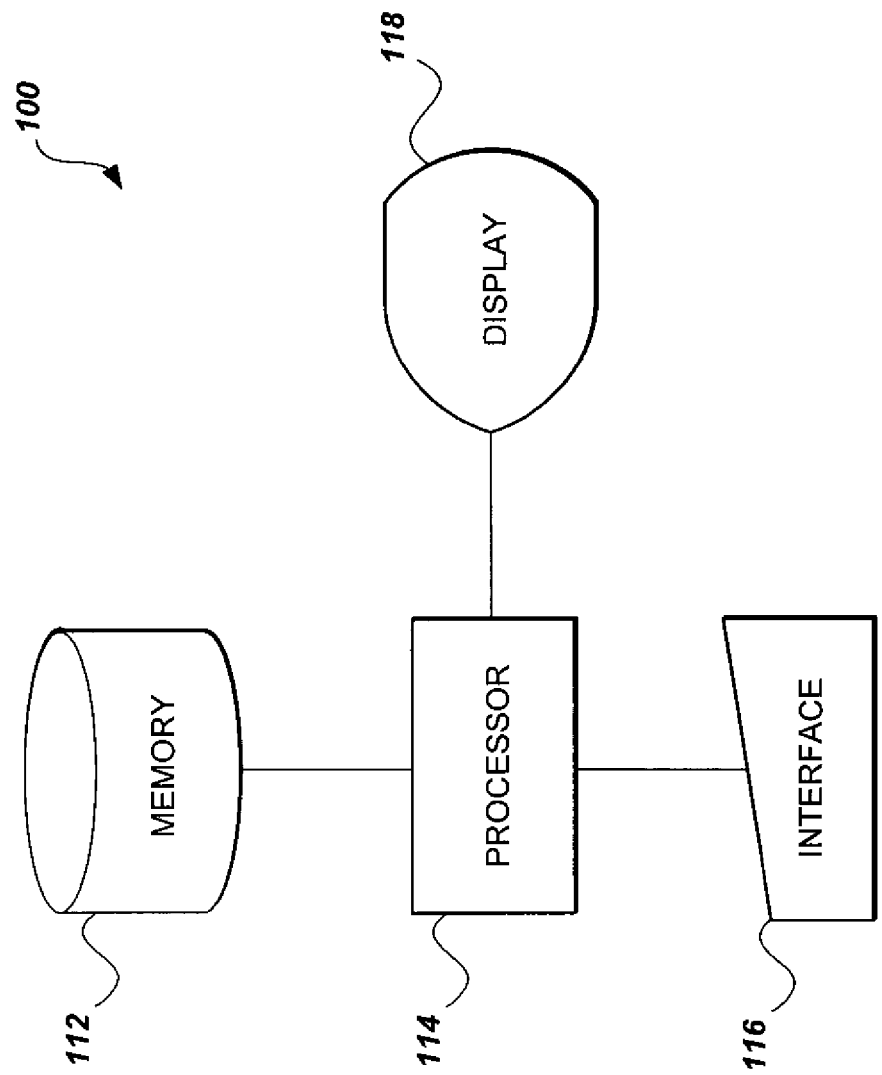

XZ-ELLIPTIC CURVE CRYPTOGRAPHY SYSTEM AND METHOD

BACKGROUND OF THE INVENTION

1. Field of the Invention

The present invention relates to computerized cryptographic systems and methods for encrypting communications in a computer network or electronic communications system, and particularly to a computerized method of performing XZ-elliptic curve cryptography and cryptographic devices incorporating the method.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

Methods of adapting discrete logarithm based algorithms to the setting of elliptic polynomials are known. However, finding discrete logarithms in this kind of group is particularly difficult. Thus, elliptic polynomial-based cryptographic algorithms can be implemented using much smaller numbers than in a finite-field setting of comparable cryptographic strength. Therefore, the use of elliptic polynomial cryptography is an improvement over finite field-based public-key cryptography.

In practice, an elliptic curve group over a finite field F is formed by choosing a pair of a and b coefficients, which are elements within F. The group consists of a finite set of points $P(x,y)$ that satisfy the elliptic curve equation:

$$F(x,y) = y^2 - x^3 - ax - b = 0, \qquad 1)$$

together with a point at infinity, O. The coordinates of the point, x and y, are elements of F represented in N-bit strings. In the following, a point is either written as a capital letter (e.g., point P) or as a pair in terms of the affine coordinates; i.e. $(x,y)$.

The elliptic curve cryptosystem relies upon the difficulty of the elliptic curve discrete logarithm problem (ECDLP) to provide its effectiveness as a cryptosystem. Using multiplicative notation, the problem can be described as: given points B and Q in the group, find a number k such that $B^k = Q$, where k is the discrete logarithm of Q to the base B. Using additive notation, the problem becomes: given two points B and Q in the group, find a number k such that $kB = Q$.

In an elliptic curve cryptosystem, the large integer k is kept private and is often referred to as the secret key. The point Q and the point B are made public, and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together, and the point-doubling operations add two copies of a point together. To compute, for example, $B = (2 \times (2 \times (2B))) + 2B = Q$, it would take three point-doublings and two point-additions.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1, y_1)$ and $(x_2, y_2)$, i.e., $(x_3, y_3) = (x_1, y_1) + (x_2, y_2)$:

TABLE 1

| Summary of Addition Rules: $(x_3, y_3) = (x_1, y_1) + (x_2, y_2)$ | |
| --- | --- |
| General Equations | $x_3 = m^2 - x_2 - x$ <br> $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_2, y_2)) = O$ |
| $(x_2, y_2) = O$ | $(x_3, y_3) = (x_1, y_1) + O = (x_1, y_1) =$ |
| $-(x_1, y_1)$ | $(x_1, -y_1)$ |

For elliptic curve encryption and decryption, given a message point $(x_m, y_m)$, a base point $(x_B, y_B)$, and a given key, k, the cipher point $(x_C, y_C)$ is obtained using the equation $(x_C, y_C) = (x_m, y_m) + k(x_B, y_B)$.

There are two basics steps in the computation of the above equations. The first step is to find the scalar multiplication of the base point with the key, $k(x_B, y_B)$. The resulting point is then added to the message point, $(x_m, y_m)$ to obtain the cipher point. At the receiver, the message point is recovered from the cipher point, which is usually transmitted, along with the shared key and the base point $(x_m, y_m) = (x_C, y_C) - k(x_B, y_B)$.

As noted above, the x-coordinate, $x_m$, is represented as an N-bit string. However, not all of the N-bits are used to carry information about the data of the secret message. Assuming that the number of bits of the x-coordinate, $x_m$, that do not carry data is L, then the extra bits L are used to ensure that message data, when embedded into the x-coordinate, will lead to an $x_m$ value that satisfies the elliptic curve equation (1). Typically, if the first guess of $x_m$ is not on a curve, then the second or third try will be.

Thus, the number of bits used to carry the bits of the message data is (N−L). If the secret data is a Kbit string, then the number of elliptic curve points needed to encrypt the K-bit data is $$\left(\frac{K}{N-L}\right).$$

It is important to note that the y-coordinate, $y_m$, of the message point carries no data bits.

An attack method, referred to as power analysis, exists in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process, is known.

As one of the measures against power analysis attack on elliptic curve cryptosystems, a method using randomized projective coordinates, is known. This is a measure against an attack method of observing whether a specific value appears or not in scalar multiplication calculations, and inferring a scalar value from the observed result. By multiplication with a random value, the appearance of such a specific value is prevented from being inferred.

In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the process of the cryptographic processing and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic curve discrete logarithm problem is so difficult that elliptic curve cryptosystems can make key lengths shorter than that in Rivest-Shamir-Adleman (RSA) cryptosystems, basing their security on the difficulty of factorization into prime factors. Thus, elliptic curve cryptosystems offer comparatively high-speed cryptographic processing with optimal security. However, the processing speed is not always high enough to satisfy smart cards, for example, which have restricted throughput or servers that have to carry out large volumes of cryptographic processing.

The pair of equations for m in Table 1 are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions for multiplications through performance of the operations in projective coordinates.

In cases where field inversions are significantly more time intensive than multiplication, it is efficient to utilize projective coordinates. An elliptic curve projective point (X,Y,Z) in conventional projective (or homogeneous) coordinates satisfies the homogeneous Weierstrass equation:

$$\tilde{F}(X,Y,Z) = Y^2 Z - X^3 - aXZ^2 - bZ^3 = 0, \qquad (2)$$

and, when $Z \neq 0$, it corresponds to the affine point $$(x, y) = \left(\frac{X}{Z}, \frac{Y}{Z}\right).$$

Other projective representations lead to more efficient implementations of the group operation, such as the Jacobian representations, where the triplets (X,Y,Z) correspond to the affine coordinates $$(x, y) = \left(\frac{X}{Z^2}, \frac{Y}{Z^3}\right)$$

whenever $Z \neq 0$. This is equivalent to using a Jacobian elliptic curve equation that is of the form:

$$\tilde{F}_J(X,Y,Z) = Y^2 - X^3 - aXZ^4 - bZ^6 = 0. \qquad (3)$$

Another commonly used projection is the Chudnovsky-Jacobian coordinate projection. In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example, for homogeneous coordinates, i=1 and j=1.

The use of projective coordinates circumvents the need for division in the computation of each point addition and point doubling during the calculation of scalar multiplication. Thus, finite field division can be avoided in the calculation of scalar multiplication, $$k\left(\frac{X_B}{Z_B^i}, \frac{Y_B}{Z_B^j}\right),$$

when using projective coordinates.

The last addition for the computation of the cipher point, $$\left(\frac{X_C}{Z_C^i}, \frac{Y_C}{Z_C^j}\right),$$

i.e., the addition of the two points $$\left(\frac{X_m}{Z_m^i}, \frac{Y_m}{Z_m^j}\right)$$

and $$k\left(\frac{X_B}{Z_B^i}, \frac{Y_B}{Z_B^j}\right),$$

can also be carried out in the chosen projection coordinate:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right).$$

It should be noted that $Z_m=1$.

However, one division (or one inversion and one multiplication) must still be carried out in order to calculate $$x_C = \frac{X_C}{Z_C^i},$$

since only the affine x-coordinate of the cipher point, $x_C$, is sent by the sender.

Thus, the encryption of (N−L) bits of the secret message using elliptic curve encryption requires at least one division when using projective coordinates. Similarly, the decryption of a single message encrypted using elliptic curve cryptography also requires at least one division when using projective coordinates.

Thus, an XZ-elliptic curve cryptography system and method solving the aforementioned problems is desired.

SUMMARY OF THE INVENTION

The XZ-elliptic curve cryptography system and method provides for improved secure communication over an insecure channel using elliptic curve cryptography. The method utilizes three stages of coordinate projections. In the first of the three stages, a projective coordinate is used to embed extra message data bits in the Z-coordinate as well as the X-coordinate. In the second stage, a projective coordinate is used to remove a division operation at each iteration (and also for randomizing the computation) in order to provide a countermeasure against differential power analysis. Once a cipher point is obtained from the first two stages, the third stage exploits the isomorphism between projected elliptic curves to embed extra message data bits by transforming the cipher point obtained from the first two stages to an isomorphic curve whose parameters are also protected by a secret key. The key of the third stage may be either symmetric or may be generated through a public-key cryptosystem.

The method of performing symmetric, enhanced XZ elliptic curve cryptography includes the following steps: (a) a sending correspondent and a receiving correspondent selecting and agreeing upon an elliptic curve set $EC^3$; (b) the sending correspondent and the receiving correspondent further agreeing upon a random scalar k and a random shared secret key for communication $E_s$, and agreeing upon a base point $(X_B,Y_B,Z_B) \in EC^3$.

The sending correspondent then performs the following steps: (c) embedding a first secret message bit string into an elliptic curve message point $(X_m,Y_m,Z_m)$; (d) computing a scalar multiplication between the base point $(X_B,Y_B,Z_B)$ and the scalar k as $(X_{Bk},Y_{Bk},Z_{Bk})=k(X_B,Y_B,Z_B)$; (e) computing a cipher point $(X_c,Y_c,Z_c)$ as $(X_c,Y_c,Z_c)=(X_m,Y_m,Z_m)+k(X_B,Y_B,Z_B)$; (f) embedding a second secret message bit string into a data transformation index $E_m$; (g) transforming the cipher point coordinates $X_c$ and $Z_c$ as $\hat{X}_C=X_C E_s$ and $\hat{Z}_C=Z_C E_m$, respectively; (h) calculating a cipher transformation index $E_c$ as $$E_c = \frac{E_s}{E_m};$$

and (i) sending a set of appropriate bits of $\hat{X}_c$, $\hat{Z}_c$ and $E_c$ to the receiving correspondent.

The receiving correspondent then performs the following steps: (j) calculating the data transformation index $E_m$ as $$E_m = \frac{E_s}{E_c};$$

(k) calculating the cipher point coordinates $X_c$ and $Z_c$ as $X_C=\hat{X}_C E_s^{-1}$ and $Z_C=\hat{Z}_C E_m^{-1}$, respectively; (l) computing a scalar multiplication between the base point $(X_B,Y_B,Z_B)$ and the scalar k as $(X_{Bk},Y_{Bk},Z_{Bk})=k(X_B,Y_B,Z_B)$; (m) computing the elliptic curve message point $(X_m,Y_m,Z_m)$ as $(X_m,Y_m,Z_m)=(X_c,Y_c,Z_c)-k(X_B,Y_B,Z_B)$; and (n) retrieving the first secret message bit string from the elliptic curve message point $(X_m,Y_m,Z_m)$.

Preferably, the shared secret key for communication $E_s$ and the data transformation index $E_m$, are selected to be powers of a common base $\mu$, i.e., $E_s=\mu^{e_s}$ and $E_m=\mu^{e_m}$. Thus, $E_c=\mu^{e_c}$ where $e_s$ is shared, $e_m$, is used for embedding the message, and $e_c$ is sent. Preferably, $\mu$ is a power of two.

In an alternative embodiment for performing public key cryptography, the sending and the receiving entities use two keys, i.e., a private key and a public key. While the pair of public and private keys that is used to obtain the cipher point $(X_c,Y_c,Z_c)$ are generated in a conventional way, the pair of public and private keys that is used to obtain the cipher transformation index $E_c$ can be generated using any suitable public key system, i.e., it can be generated using RSA, an elliptic curve method or the like.

The alternative method of performing symmetric, enhanced XZ elliptic curve cryptography with a public key includes the following steps: (a) a sending correspondent and a receiving correspondent selecting and agreeing upon an elliptic curve set $EC^3$, the sending correspondent further establishing a private key pair $(k_{SPr},e_{SPr})$; and (b) the sending correspondent and the receiving correspondent further agreeing upon a base point $(X_B,Y_B,Z_B) \in EC^3$ and sharing a public key pair $(k_{SPr}(X_B,Y_B,Z_B), E_b^{e_{SPr}})$.

The sending correspondent then performs the following steps: (c) calculating a shared key as $(k_{SPr}(k_{RPr}(X_B,Y_B,Z_B)), (E_b^{e_{RPr}})^{e_{SPr}})$; (d) embedding a first secret message bit string into an elliptic curve message point $(X_m,Y_m,Z_m)$; (e) computing a cipher point $(X_c,Y_c,Z_c)$ as $(X_c,Y_c,Z_c)=(X_m,Y_m,Z_m)+k_{SPr}(k_{RPr}(X_B,Y_B,Z_E))$; (f) embedding a second secret message bit string into a data transformation index $E_m$; (g) transforming the cipher point coordinates $X_c$ and $Z_c$ as $\hat{X}_C = X_C(E_b^{e_{RPr}})^{e_{SPr}}$ and $\hat{Z}_C = Z_C E_m$, respectively; (h) calculating a cipher transformation index $E_c$ as $$E_c = \frac{(E_b^{e_{RPr}})^{e_{SPr}}}{E_m};$$

and (i) sending a set of appropriate bits of $\hat{X}_c$, $\hat{Z}_c$ and $E_c$ to the receiving correspondent.

The receiving correspondent then performs the following steps: (j) calculating the shared key as $(k_{RPr}(k_{SPr}(X_B,Y_B,Z_B)), (E_b^{e_{SPr}})^{e_{RPr}})$; (k) calculating the data transformation index $E_m$ as $$E_m = \frac{(E_b^{e_{RPr}})^{e_{SPr}}}{E_c};$$

(l) calculating the cipher point coordinates $X_c$ and $Z_c$ as $X_C = \hat{X}_C((E_b^{e_{RPr}})^{e_{SPr}})^{-1}$ and $Z_C = \hat{Z}_C E_m^{-1}$, respectively; (m) computing the elliptic curve message point $(X_m,Y_m,Z_m)$ as $(X_m,Y_m,Z_m)=(X_c,Y_c,Z_c)-k_{RPr}(k_{SPr}(X_B,Y_B,Z_B))$; and (n) retrieving the first secret message bit string from the elliptic curve message point $(X_m,Y_m,Z_m)$.

As in the previous embodiment, preferably, the shared number $E_b$ and the data transformation index $E_m$ are selected to be powers of a common base $\mu$, i.e., $E_b = \mu^{e_b}$ and $E_m = \mu^{e_m}$. Thus, $E_c = \mu^{e_c}$ where $e_m$ is used for embedding the message and $e_c$ is sent. Preferably, $\mu$ is a power of two.

In conventional elliptic curve cryptography, encryption and decryption, the message data bits are embedded in only the affine x-coordinate $x_m$ of the elliptic curve points. Further, given an elliptic curve defined over $F(p)$ that needs N bits for the representation of its elements, each x-coordinate $x_m$ carries only (N−L) bits of the message data bits. Thus, at least one inversion or division over $F(p)$ (i.e., one modulo p inversion or division) is needed per (N−L)-bit encryption.

In the present method, the encryption of more than (2N−L) bits of the message data is achieved per one inversion or division over $F(p)$, i.e., per one modulo p inversion or division. This is achieved by first defining an elliptic curve group over addition in projective coordinates, which allows the embedding of one part of the message data bit-string in both the X-coordinate and the Z-coordinate of the elliptic curve points, where X and Z are elements of $F(p)$ represented in N-bit strings; and secondly, transforming the cipher point to an isomorphic curve which is determined by the second part of the message data bit-string. In the present method, the relevant bits of both the X- and Z-coordinates of the transformed cipher point, as well as the bits of the ciphered transformation index $E_c$, are sent to the receiver.

At the receiving entity, the message bits are recovered from X- and Z-coordinates of the cipher point, as well as the bits of the ciphered transformation index $E_c$, which is achieved using one inversion or division over $F(p)$ (i.e., one modulo p inversion or division).

Further, in the present method, an additional projective coordinate is used at the sending and receiving entities to eliminate the inversion or division during each addition and doubling operation of the scalar multiplication. Thus, up to (3N−L) bits of the message data can be encrypted (and subsequently decrypted) using one inversion or division.

The use of embedding in the X- and Z-coordinates of an elliptic curve point, combined with the embedding in the transformation index, increases the number of points that satisfy an elliptic curve equation, which can then be used in the corresponding cryptosystem, such that the number of points is proportional to $p^3$ rather than p. Thus, for the same number of embedded bits, a smaller p can be used when embedding in the X- and Z-coordinates, as well as the transformation index, than when embedding only in the x-coordinate. This results in faster implementations and reduced power consumption.

These and other features of the present invention will become readily apparent upon further review of the following specification and drawings.

BRIEF DESCRIPTION OF THE DRAWINGS

The sole drawing FIGURE is a block diagram illustrating system components for an XZ-elliptic curve cryptography system and method according to the present invention.

DETAILED DESCRIPTION OF THE PREFERRED EMBODIMENTS

The XZ-elliptic curve cryptography system and method provides for improved secure communication over an insecure channel using elliptic curve cryptography. The method utilizes three stages of coordinate projections. In the first of the three stages, a projective coordinate is used to embed extra message data bits in the Z-coordinate as well as the X-coordinate. In the second stage, a projective coordinate is used to remove a division operation at each iteration (and also for randomizing the computation) in order to provide a countermeasure against differential power analysis. Once a cipher point is obtained from the first two stages, the third stage exploits the isomorphism between projected elliptic curves to embed extra message data bits by transforming the cipher point obtained from the first two stages to an isomorphic curve whose parameters are also protected by a secret key. The key of the third stage may be either symmetric or may be generated through a public-key cryptosystem.

The method begins by defining a set of elliptic curve points represented in projective coordinates as a group over addition. Given a field $F(p)$, and defining a & $b \in F(p)$, where the symbol $\in$ denotes set membership, $EC^2$ is defined as the set of points (x,y) that satisfy the elliptic curve equation in affine coordinates (i.e., $F(x,y)=y^2-x^3-ax-b=0$), where x & $y \in F(p)$, together with a point at infinity.

It is known that using the addition rules defined above for the set of points $EC^2$, the set $EC^2$ forms an abelian group over addition, denoted as $(EC^2, +)$. The present method utilizes a projection (X,Y,Z), which is related to the affine coordinates as:

$$y = \frac{Y}{Z^{\frac{3}{2}}} \qquad (4)$$

-continued $$x = \frac{X}{Z}. \quad (5)$$

Substitution of equations (5) and (6) into the elliptic curve equation yields:

$$\tilde{F}(X,Y,Z) = Z^3 F\left(\frac{X}{Z}, \frac{Y}{Z^{\frac{3}{2}}}\right) = Y^2 - X^3 - aXZ^2 - bZ^3 = 0. \quad (6)$$

It should be noted that if $F(x,y)$ is non-singular (i.e., $4a^2+27b^3 \neq 0$), then $\tilde{F}(X,Y,Z)$ is also non-singular. In the following, it is assumed that the elliptic curve equations are non-singular.

The set of points $EC^3$ is defined as the triplets $(X,Y,Z)$, where $X, Y$ & $Z \in F(p)$, that satisfy equation (6), along with a point at infinity $(X_1, Y_1, Z_1)$, and excluding the point at the origin $(0,0,0)$. It should be noted that $EC^3$ is in projective coordinates, while $EC^2$ is in affine coordinates. The addition rules for the group $(EC^2, +)$ can be adopted to define an additive binary operation, denoted as "+", over $EC^3$. For all $(X_1,Y_1,Z_1) \in EC^3$ and $(X_2,Y_2,Z_2) \in EC^3$, the sum $(X_3,Y_3,Z_3) = (X_1Y_1Z_1) + (X_2,Y_2, Z_2)$ is also $(X_3,Y_3,Z_3) \in EC^3$.

It can be seen that $(EC^3, +)$ also forms a group over addition that satisfies the following axioms: (i) There exists $(X_1,Y_1,Z_1) \in EC^3$ such that $(X,Y,Z) + (X_1,Y_1,Z_1) = (X,Y,Z)$ for all $(X,Y,Z) \in EC(K^3)$; (ii) for every $(X,Y,Z) \in EC^3$, there exists $-(X,Y,Z) \in EC^3$ such that $(X,Y,Z) - (X,Y,Z) = (X_1,Y_1,Z_1)$; (iii) the additive binary operation is commutative; and (iv) the additive binary operation is associative.

With regard to the addition rules for the group $(EC^3, +)$, the addition of two points on an elliptic curve in projective coordinate $EC^3$ is calculated as follows. When a straight line is drawn through two points of $EC^3$, the straight line intersects the elliptic curve in projective coordinates at a third point. The point symmetric to this third intersecting point, with respect to the X-axis, is defined as a point resulting from the addition.

A straight-line equation in projective coordinates is given by:

$$\frac{X-X_1}{X_2-X_1} = \frac{Y-Y_1}{Y_2-Y_1} = \frac{Z-Z_1}{Z_2-Z_1}. \quad (7)$$

The basic addition rule can be formulated as follows: Draw the line that joins the two points to be added in the set $EC^3$. Denoting the third point of intersection as $(X'_3, Y'_3, Z'_3)$, the sum point is defined as $(X_3, Y_3, Z_3) = (X'_3, Y'_3, Z'_3)$. It follows from the above definition that the addition over $EC^3$ is commutative, that is:

$$(X_1,Y_1,Z_1)+(X_2,Y_2,Z_2)=(X_2,Y_2,Z_2)+(X_1,Y_1,Z_1)$$

for all $(X_1,Y_1,Z_1) \in E(K^3)$ and $(X_2,Y_2,Z_2) \in E(K^3)$. This satisfies axiom (iii) above.

There are four main cases that need to be considered for the computation of addition for $(EC^3, +)$:
(A) $X_1 \neq X_2$;
(B) $X_1 = X_2$ and $Z_1 \neq Z_2$;
(C) $(X_1,Y_1,Z_1) = (X_2,Y_2,Z_2)$ (i.e., point doubling); and
(D) $X_1 = X_2$ and $Z_1 = Z_2$.

For case (A) where $X_1 \neq X_2$, we have:

$$Y'_3 = Y_1 + m_y(X'_3 - X_1) \quad (8)$$

and $$Z'_3 = Z_1 + m_z(X'_3 - X_1), \quad (9)$$

where $$m_y = \frac{Y_2 - Y_1}{X_2 - X_1} \quad (10)$$

and $$m_z = \frac{Z_2 - Z_1}{X_2 - X_1}. \quad (11)$$

Substituting equation (8) for $Y'_3$ and equation (9) for $Z'_3$ into equation (6) yields:

$$(Y_1+m_y(X-X_1))^2 - X^3 - aX(Z_1+m_z(X-X_1))^2 - b(Z_1+m_z(X-X_1))^3 = 0 \quad (12)$$

Expanding the terms between parentheses and grouping the terms with the same powers of X gives:

$$X^3 + am_z^2 X^3 + bm_z^3 X^3$$

$$-m_y^2 X^2 + 2am_z Z_1 X^2$$

$$-2am_z^2 X^2 X_1 + bm_z^2 Z_1 X^2 + 2bm_z^2 Z_1 X^2$$

$$-2bm_z^3 X^2 X_1 - bm_z^3 X^2 X_1$$

$$-2m_y Y_1 X + 2m_y^2 X X_1 + aXZ_1^2 - 2am_z Z_1 X X_1$$

$$+am_z^2 X X_1^2 + 2bm_z Z_1^2 X - 2X X_1 bm_z^2 Z_1 + bm_z X Z_1^2$$

$$-4bm_z^2 Z_1 X X_1 + bm_z^3 X X_1^2 + 2bm_z^3 X Z_1^2$$

$$-Y_1^2 + 2m_y Y_1 X_1 - m_y^2 X_1^2 + bZ_1^3 - 2bm_z Z_1^2 X_1$$

$$+bX_1^2 m_z^2 Z_1 - bm_z X_1 Z_1^2 + 2bm_z^2 Z_1 X_1 - bm_z^3 X_1^3 = 0. \quad (13)$$

In order to solve the above, it is recognized that any cubic equation has three roots, such that $$(X-X_1)(X-X_2)(X-X'_3)=0, \quad (14)$$

and scaling the coefficient of the term $X^3$ to 1 in equation (13), and equating the coefficient of the term $X^2$ in equations (13) and (14), yields:

$$X'_3 = \frac{1}{c}(m_y^2 - 2am_z Z_1 + 2am_z^2 X_1 - 3bm_z^2 Z_1 + 3bm_z^3 X_1) - X_1 - X_2 \quad (15)$$

or $$X'_3 = \frac{1}{c}(m_y^2 - (2a+3bm_z)m_z Z_1 + (2a+3bm_z)m_z^2 X_1) - X_1 - X_2. \quad (16)$$

After grouping terms to reduce the number of computations, one obtains:

$$X'_3 = \frac{1}{c}(m_y^2 - m_z(2a+3bm_z)(Z_1 - m_z X_1)) - X_1 - X_2, \quad (17)$$

where $$c = 1 + am_z^2 + bm_z^3. \quad (18)$$

Substituting the solution of $X'_3$, which is given in equation (17), into equation (8) yields the solution for $Y'_3$. Similarly, substituting the solution of $X'_3$, which is given in equation (17), into equation (9) produces the solution for $Z'_3$.

For case (B), where $X_1=X_2$ and $Z_1 \neq Z_2$, we let $X_0=X_1=X_2$. In this case, $X_3=X_1=X_2=X_0$, since the straight line is in the YZ-plane $X_0$. Thus, one can write:

$$Y'_3 = Y_1 + n_y(Z'_3 - Z_1), \quad (19)$$

where $$n_y = \frac{Y_2 - Y_1}{Z_2 - Z_1}.$$

Substituting equation (19) into equation (6) (and noting that $X=X_0$) yields:

$$(Y_1 + n_y(Z-Z_1))^2 - X_0^3 a X_0 Z^2 - bZ^3 = 0. \quad (20)$$

Expanding the terms between parentheses and grouping the terms with the same powers of Z, one obtains:

$$Z^3 - \frac{1}{b}(n_y^2 Z^2 - aX_0 Z^2) + \\ \frac{1}{b}(2n_y Y_1 Z - 2n_y^2 Z Z_1 + Y_1^2 - 2n_y Y_1 Z_1 + n_y^2 Z_1^2 - X_0^3) = 0. \quad (21)$$

In order to solve the above, it is recognized that any cubic equation has three roots, such that:

$$(Z-Z_1)(Z-Z_2)(Z-Z'_3)=0 \quad (22).$$

Equating the coefficient of the term $Z^2$ in equations (21) and (22), one obtains:

$$Z'_3 = \frac{1}{b}(n_y^2 - aX_0) - Z_1 - Z_2, \quad (23)$$

and substituting the solution of $Z'_3$ into equation (19) produces the solution for $Y'_3$.

For case (C), which involves point doubling, $(X_1,Y_1,Z_1)=(X_2,Y_2,Z_2)$. Letting $(X_0,Y_0,Z_0)=(X_1,Y_1,Z_1)=(X_2,Y_2,Z_2)$, then $(X_3,Y_3,Z_3)=2(X_0,Y_0,Z_0)$. Doubling a point on an elliptic curve in projective coordinates can be defined in several ways. In the first case (C.1), when a tangent line in an XY-plane is drawn at a point on an elliptic curve, the tangent line intersects the elliptic curve in the projective coordinates $EC^3$ at another point. The point symmetric to this intersecting point with respect to the X-axis is defined as a point resulting from the doubling. It should be noted that in this case, $Z'_3=Z_0$.

In the second case (C.2), when a tangent line in a YZ-plane is drawn at a point on an elliptic curve, the tangent line intersects the elliptic curve in the projective coordinates $EC^3$ at another point. The point symmetric to this intersecting point with respect to the X-axis is defined as a point resulting from the doubling. It should be noted that in this case, $X'_3=X_0$.

In a third case (C.3), some form of a combination of rules (C.1) and (C.2) may be used. The simplest combination is to perform doubling using rule (C.1) followed by another doubling using rule (C.2). Another combination involves using the gradients in (C.1) and (C.2) simultaneously.

For case (C.1), $Z_3=Z_1=Z_2=Z_0$. The gradient of the tangent of the point $(X_0,Y_0,Z_0)$ of the elliptic curve in projective coordinates in an XY-plane is given by:

$$\frac{dY}{dX} = \frac{3X_o^2 + aZ_o^2}{2Y_o} = m_y. \quad (24)$$

Substituting equation (24) for $m_y$ in the equation for $X'_3$, and noting that $m_z=0$ in this case, one obtains the solution for $X'_3$:

$$X'_3 = m_y^2 - X_1 - X_2. \quad (25)$$

One may similarly obtain the solution for $Y'_3$ from case (A) above.

For case (C.2), $X_3=X_1=X_2=X_0$. The gradient of the tangent of the point $(X_0,Y_0,Z_0)$ of the elliptic curve in projective coordinates in a YZ-plane is given by:

$$\frac{dY}{dZ} = \frac{2aX_o Z_o + 3bZ_o^2}{2Y_o} = n_y. \quad (26)$$

Substituting equation (26) for $n_y$ in equation (23), one obtains a solution for $Z'_3$:

$$Z'_3 = \frac{1}{b}(n_y^2 - aX_o) - Z_1 - Z_2. \quad (27)$$

Similarly, substituting the solution of $Z'_3$ into equation (19), one obtains the solution for $Y'_3$.

For case (D), $X_1=X_2$ and $Z_1=Z_2$. Letting $X_0=X_1=X_2$ and $Z_0=Z_1=Z_2$ allows for substitution of these values directly into equation (6), thus producing a quadratic equation for the Y-coordinate:

$$Y^2 = X_0^3 + aX_0 Z_0^2 + bZ_0^3, \quad (28)$$

where $Y_0$ represents one of the solutions. The other solution must be $-Y_0$.

Therefore, a line perpendicular to the XZ-plane intersects $EC^3$ at only two points: $(X,Y,Z)$ and $(X,-Y,Z) \in EC^3$. This clearly shows the symmetry of $EC^3$ about the X-axis and the Z-axis. Furthermore, every $(X,Y,Z) \in EC^3$ has a unique mirror image point $(X,-Y,Z) \in EC^3$. Thus, since a line joining such pairs $(X,Y,Z)$ and $(X,-Y,Z) \in EC^3$ does not intersect with $EC^3$ at a third finite point, such lines are assumed to intersect with $EC^3$ at the point of infinity $(X_I,Y_I,Z_I)$. This point at infinity is used to define both the inverse of a point in $EC^3$ and the identity point. According to the addition rule defined above, one can write:

$$(X,Y,Z)+(X,-Y,Z)=(X_I,Y_I,Z_I), \quad (29)$$

since the third point of intersection of such lines is the point at infinity. This equation therefore defines a unique inverse for any point $(X,Y,Z) \in EC^3$, $$-(X,Y,Z)=(X,-Y,Z). \quad (30)$$

Thus, equation (29) can be written as:

$$(X,Y,Z)-(X,Y,Z)=(X_I,Y_I,Z_I). \quad (31)$$

Additionally, a line joining the point at infinity and any point $(X,Y,Z) \in EC$ will intersect with $EC^3$ at $(X,-Y,Z)$. Therefore, from the addition rule defined above, one may also write:

$$(X,Y,Z)+(X_I,Y_I,Z_I)=(X,Y,Z). \quad (32)$$

Equation (31) satisfies axiom (ii) while equation (32) satisfies axiom (i) of the group $(EC^3,+)$.

With regard to the second projective coordinate, each of the equations for point addition and point doubling derived for the cases (A), (B) and (C) above require one modular inversion or division. In cases where field inversions or divisions are significantly more expensive than multiplication (in terms of time and computational power), a second projective coordinate is used to remove the requirement for field inversion or division from these equations. As shown below, the number of operations needed for $EC^3$ point doubling and point addition when performed in the second projective coordinate are comparable to those needed in $EC^2$. It should be noted that several projective coordinates can be used. In the present method, the homogenous projection is used as an example:

$$X = \frac{X}{V} \tag{33}$$

$$Y = \frac{Y}{V} \tag{34}$$

$$Z = \frac{Z}{V}. \tag{35}$$

Using this projection in the elliptic curve equation given by equation (6), one obtains a homogeneous elliptic curve equation:

$$\tilde{F}(X,Y,Z,V) = V\tilde{F}\left(\frac{X}{V}, \frac{Y}{V}, \frac{Z}{V}\right) = Y^2 V - X^3 - aXZ^2 - bZ^3 = 0 \tag{36}$$

where an elliptic curve projective point $(X,Y,Z,V)$ using homogenous projective coordinates satisfies the homogenous elliptic curve equation (36).

When $V \neq 0$, the homogenous projected point $(X,Y,Z,V)$ corresponds to the projected point $$(X, Y, Z) = \left(\frac{X}{V}, \frac{Y}{V}, \frac{Z}{V}\right).$$

Using homogenous projective coordinates, the equation for point addition can be written as:

$$\left(\frac{X_3}{V_3}, \frac{Y_3}{V_3}, \frac{Z_3}{V_3}\right) = \left(\frac{X_1}{V_1}, \frac{Y_1}{V_1}, \frac{Z_1}{V_1}\right) + \left(\frac{X_2}{V_2}, \frac{Y_2}{V_2}, \frac{Z_2}{V_2}\right). \tag{37}$$

In the following, it is shown how the homogenous projective coordinates can be used to remove the need for modular inversion or division from the equations given above for cases (A), (B) and (C). Starting with case (A), substitution for X, Y and Z in terms of the projective coordinates in equations (33), (34) and (35) into the equation given above for $X_3'$, and noting that $c=1+am_z^2+bm_z^3$, yields:

$$\frac{X_3'}{V_3} = -\frac{(\lambda_{yv}^2 \lambda_{xv} - 2a\lambda_{zv}\lambda_{xv}^2 Z_1 + 2a\lambda_{zv}^2 \lambda_{xv} X_1 - 3b\lambda_{zv}^2 \lambda_{xv} Z_1 + 3b\lambda_{zv}^2 X_1)}{\lambda_{xzv}} - \frac{X_1'}{V_1} - \frac{X_2'}{V_2}, \tag{38}$$

where $$\lambda_{xv} = (X_2 V_1 - X_1 V_2) \tag{39}$$

$$\lambda_{yv} = (Y_2 V_1 - Z_1 V_2) \tag{40}$$

$$\lambda_{zv} = (Z_2 V_1 - Z_1 V_2) \tag{41}$$

$$\lambda_{xzv} = (\lambda_{xv}^3 + a\lambda_{xv}\lambda_{zv}^2 + b\lambda_{zv}^3). \tag{42}$$

Letting $$V_3 = V_1 V_2 \lambda_{xv} \lambda_{xzv} \tag{43}$$

and substituting equation (43) for $V_3$ in equation (38), one obtains $$X_3' = \lambda_{xv} A_{x3}, \tag{44}$$

where $$A_{x3} = \{\lambda_{yv}^2 \lambda_{xv} V_2 - (2a\lambda_{xv} + 3b\lambda_{xv})(\lambda_{xv} Z_1 V_2 - \lambda_{zv} X_1 V_2) - \lambda_{xzv}(V_2 X_1 + V_1 X_2)\}. \tag{45}$$

Substituting for X and Y in terms of the projective coordinates in equations (33) and (34) into the equation given above for $Y_3'$, and following simplification, gives:

$$\frac{Y_3'}{V_3} = \frac{Y_1}{V_1} + \frac{(Y_2 V_1 - Y_1 V_2)}{(X_2 V_1 - X_1 V_2) V_3}\left(X_3' - \frac{X_1 V_3}{V_1}\right). \tag{46}$$

Substituting equations (43) and (44) for $V_3$ and $X_3'$ into equation (46) produces $$Y_3' = V_2 \lambda_{xv} \lambda_{xzv} Y_1 + \lambda_{yv}(A_{x3} - V_2 \lambda_{xzv} X_1), \tag{47}$$

and substituting X and Z in terms of the projective coordinates in equations (33) and (35) into the equation given above for $Z_3'$, and following simplification, gives:

$$\frac{Z_3'}{V_3} = \frac{Z_1}{V_1} + \frac{(Z_2 V_1 - Z_1 V_2)}{(X_2 V_1 - X_1 V_2) V_3}\left(X_3' - \frac{X_1 V_3}{V_1}\right). \tag{48}$$

Substituting equations (43) and (44) for $V_3$ and $X_3'$ into equation (48) produces $$Z_3' = V_2 \lambda_{xv} \lambda_{xzv} Z_1 + \lambda_{xv}(A_{x3} - V_2 \lambda_{xzv} X_1). \tag{49}$$

The number of field operations needed in equations (44), (47) and (49) are 24 multiplications, three squaring operations, and ten addition operations. When using mixed coordinates, the number of multiplications can be reduced to twenty multiplications.

For case (B), substituting X, Y and Z in terms of the heterogeneous projective coordinate into the equation given above for $Z_3'$, and noting that $X_3 = X_1 = X_2 = X_0$, one obtains:

$$\frac{Z_3'}{V_3} = \frac{1}{b} \frac{(Y_2 V_1 - Y_1 V_2)^2}{V_1 V_2 (Z_2 V_1 - Z_1 V_2)^2} - \frac{a}{b} \frac{X_1}{V_1} - \frac{Z_1}{V_1} - \frac{Z_2}{V_2}, \tag{50}$$

and letting $$V_3 = V_1^2 V_2^2 (Z_2 V_1 - Z_1 V_2)^3, \tag{51}$$

allows for the substitution of equation (51) for $V_3$ into equation (50), yielding:

$$Z_3' = \frac{1}{b} V_1 V_2 (Z_2 V_1 - Z_1 V_2) A_{3x}, \tag{52}$$

where $$A_{3x} = \left\{(Y_2V_1 - Y_1V_2)^2 - (Z_2V_1^2 - Z_1V_2^2)^2\left(\frac{a}{b}X_1V_2 + Z_1V_2 + Z_2V_1\right)\right\}. \quad (53)$$

Substituting Y and Z in terms of the projective coordinates in equations (40) and (41) into the equation for $Y_3'$ produces:

$$\frac{Y_3'}{V_3} = \frac{Y_1}{V_1} + \frac{(Y_2V_1 - Y_1V_2)}{V_3} \times \left(\frac{Z_3'}{V_1V_2(Z_2V_1 - Z_1V_2)} - \frac{Z_1V_3}{V_1V_2(Z_2V_1 - Z_1V_2)V_1}\right), \quad (54)$$

and substituting equations (51) and (52) for $V_3$ and $Z'_3$ into equation (54) gives $$Y_3' = V_1V_2^2(Z_2V_1 - Z_1V_2)^3Y_1 + (Y_2V_1 - Y_1V_2)\left(\frac{1}{b}A_{3x} - Z_1V_2(Z_2V_1 - Z_1V_2)^2\right). \quad (55)$$

The number of field operations needed in equations (52) and (55) are sixteen multiplication operations, two squaring operations, and seven addition operations.

For case (C.1), substituting X, Y and Z in terms of the projective coordinates in equations (39), (40) and (41) into the equation for $X'_3$ produces $$\frac{X_3'}{V_3} = \frac{(3X_o^2 + aZ_o^2)^2}{4V_o^2Y_o^2} - 2\frac{X_o}{V_o}, \quad (56)$$

and letting $$V_3 = 8V_o^3Y_o^3 \quad (57)$$

allows for the substitution of equation (57) into equation (56), yielding:

$$X'_3 = 2V_0Y_0D_{3x}, \quad (58)$$

where $$D_{3x} = \{(3X_0^2 + aZ_0^2)^2 - 8V_0Y_0^2X_0\}. \quad (59)$$

Substituting X, Y and Z in terms of the projective coordinates in equations in equations (39), (40) and (41) into the equation for $Y_3'$, and using the gradient, produces $$\frac{Y_3'}{V_3} = \frac{Y_o}{V_o} + \frac{3X_o^2 + aZ_o^2}{V_3}\left(\frac{2V_oY_oD_{3x}}{2V_oY_o} - \frac{X_oV_3}{2V_oY_oV_o}\right), \quad (60)$$

and substituting equations (57), (58) and (59) for $V_3$, $X'_3$ and $D_{3x}$ gives:

$$Y'_3 = 8V_0^2Y_0^4 + 3X_0^2 + aZ_0^2((3X_0^2 + aZ_0^2)^2 - 12V_0Y_0^2X_0). \quad (61)$$

The number of field operations needed in equations (58) and (61) are six multiplication operations, four squaring operations, and five addition operations.

For case (C.1), substituting X, Y and Z in terms of the projective coordinates in equations (39), (40) and (41) into the equation for $Z'_3$ produces $$\frac{Z_3'}{V_3} = \frac{1}{b}\frac{(2aX_oZ_o + 3bZ_o^2)^2}{4Y_o^2V_o^2} - \frac{a}{b}\frac{X_o}{V_o} - 2\frac{Z_o}{V_o} \quad (62)$$

and letting $$V_3 = 8V_o^3Y_o^3 \quad (63)$$

allows for the substitution of equation (63) into equation (62), yielding:

$$Z'_3 = 2V_0Y_0D_{3z} \quad (64)$$

where $$D_{3z} = \left\{\frac{1}{b}(2aX_oZ_o + 3bZ_o^2)^2 - 4\frac{a}{b}V_oY_o^2X_o - 16V_oY_o^2Z_o\right\}, \quad (65)$$

and substituting X, Y and Z in terms of the projective coordinate in equations (39), (40) and (41) into the equation for $Y'_3$, and using the gradient, gives:

$$\frac{Y_3'}{V_3} = \frac{Y_0}{V_o} + \frac{2aX_oZ_o + 3bZ_o^2}{2V_oY_0}\left(\frac{Z_3'}{V_3} - \frac{Z_o}{V_o}\right). \quad (66)$$

Substituting equations (63) and (64) for $V_3$ and $Z'_3$ into equation (66) produces $$Y'_3 = 8V_0^2Y_0^3Y_0 + (2aX_0Z_0 + 3bZ_0^2)(D_{3z} - 4V_0Y_0^2Z_0). \quad (67)$$

The number of field operations needed in equations (64) and (67) are ten multiplication operations, three squaring operations, and five addition operations.

A third projection is applied to equation (6) in order to produce the present enhanced XZ elliptic curve system. Letting a secret transformation index $E_s$ be used to project equation (6) yields:

$$\tilde{F}(X, Y, Z, E_s) = E_s^3 F(X, Y, Z) = E_s^3(Y^2 - X^3 - aXZ^2 - bZ^3) = 0. \quad (68)$$

By introducing a data transformation index $E_m$, and the cipher transformation index $E_c$, such that $E_s = E_m E_c$, produces:

$$\tilde{F}(X,Y,Z,E_s) = Y^2E_s^3 - X^3E_s^3 - aXZ^2E_sE_m^2E_c^2 - bZ^3E_m^3E_c^3 = 0. \quad (69)$$

The following substitutions may then be applied:

$$\hat{Y} = YE_s^{\frac{3}{2}},\ \hat{X} = XE_s,\ \hat{Z} = ZE_m,\ \hat{a} = aE_c^2,\ \hat{b} = bE_c^3, \quad (70)$$

to produce:

$$\tilde{F}(X,Y,Z,E_x) = \hat{Y}^2 - \hat{X}^3 - \hat{a}\hat{X}\hat{Z}^2 - \hat{b}\hat{Z}^3 = \tilde{F}(\hat{X},\hat{Y},\hat{Z}) = 0. \quad (71)$$

Thus, any point on the curve $\tilde{F}(X,Y,Z)$ can be transformed using the values $E_s$, $E_m$ and $E_c$ to the isomorphic curve $\tilde{F}(\hat{X},\hat{Y},\hat{Z})$. Due to the relationship between $E_s$, $E_m$ and $E_c$, the knowledge of two of them is necessary to know the third. Otherwise, the original curve cannot be retrieved.

The multiplicative relationship between $E_s$, $E_m$ and $E_c$ indicates that a field division is required when computing $E_m$ or $E_c$. The need for this division operation can be relieved if $E_s$, $E_m$ and $E_c$ are chosen to be powers of a common base $\mu \in F(p)$, i.e., when $E_s = \mu^{e_s}$, $E_m = \mu^{e_m}$ and $E_c = \mu^{e_c}$. In this case, $e_s = e_m + e_c$ and equation (69) becomes:

$$\tilde{F}(X,Y,Z,\mu^{e_s}) = Y^2\mu^{3e_s} - X^3\mu^{3e_s} - aXZ^2\mu^{e_s+2(e_m+e_c)} - bZ^3\mu^{3(e_m+e_c)} = 0. \quad (72)$$

Then, the following substitutions can be applied:

$$\overline{Y} = Y\mu^{\frac{3}{2}e_s}, \; \overline{X} = X\mu^{e_s}, \; \overline{Z} = Z\mu^{e_m}, \; \overline{a} = a\mu^{2e_c}, \; \overline{b} = b\mu^{3e_c}, \quad (73)$$

in order to produce:

$$\tilde{F}(X,Y,Z,\mu^{e_s}) = \overline{Y}^2 - \overline{Y}^3 - \overline{a}\,\overline{X}\,\overline{Z}^2 - \overline{b}\,\overline{Z}^3 = \tilde{F}(\overline{X},\overline{Y},\overline{Z}) = 0. \quad (74)$$

Again, it is necessary to know two of the exponents $e_s$, $e_m$, and $e_c$ to know the third.

It should be noted that choosing $\mu$ as a power of two makes this transformation very efficient, since both multiplication and division operations can be implemented through a shift-and-reduce operation. Further, a special choice of the value of $\mu$ would allow the transformation of a point from or to the twist of the curve. In particular, if the value of $\mu$ is a quadratic non-residue in $GF(p)$, then an odd value of $e_s$ transforms the point to the twist of the curve, since Y will be multiplied by $$\mu^{\frac{3}{2}e_s}.$$

The present method of performing symmetric, enhanced XZ elliptic curve cryptography includes the following steps: (a) a sending correspondent and a receiving correspondent selecting and agreeing upon an elliptic curve set $EC^3$ and (b) the sending correspondent and the receiving correspondent further agreeing upon a random scalar k and a random shared secret key for communication $E_s$, and agreeing upon a base point $(X_B, Y_B, Z_B) \in EC^3$.

The sending correspondent then performs the following steps: (c) embedding a first secret message bit string into an elliptic curve message point $(X_m, Y_m, Z_m)$; (d) computing a scalar multiplication between the base point $(X_B, Y_B, Z_B)$ and the scalar k as $(X_{Bk}, Y_{Bk}, Z_{Bk}) = k(X_B, Y_B, Z_B)$; (e) computing a cipher point $(X_c, Y_c, Z_c)$ as $(X_c, Y_c, Z_c) = (X_m, Y_m, Z_m) + k(X_B, Y_B, Z_B)$; (f) embedding a second secret message bit string into a data transformation index $E_m$; (g) transforming the cipher point coordinates $X_c$ and $Z_c$ as $\hat{X}_C = X_C E_s$ and $\hat{Z}_C = Z_C E_m$, respectively; (h) calculating a cipher transformation index $E_c$ as $$E_c = \frac{E_s}{E_m};$$

and (i) sending a set of appropriate bits of $\hat{X}_c$, $\hat{Z}_c$, and $E_c$ to the receiving correspondent.

The receiving correspondent then performs the following steps: (j) calculating the data transformation index $E_m$ as $$E_m = \frac{E_s}{E_c};$$

(k) calculating the cipher point coordinates $X_c$ and $Z_c$ as $X_C = \hat{X}_C E_s^{-1}$ and $Z_C = \hat{Z}_C E_m^{-1}$, respectively; (l) computing a scalar multiplication between the base point $(X_B, Y_B, Z_B)$ and the scalar k as $(X_{Bk}, Y_{Bk}, Z_{Bk}) = k(X_B, Y_B, Z_B)$; (m) computing the elliptic curve message point $(X_m, Y_m, Z_m)$ as $(X_m, Y_m, Z_m) = (X_c, Y_c, Z_c) - k(X_B, Y_D, Z_B)$; and (n) retrieving the first secret message bit string from the elliptic curve message point $(X_m, Y_m, Z_m)$.

Preferably, the shared secret key for communication $E_s$ and the data transformation index $E_m$, are selected so be powers of a common base $\mu$, i.e., $E_s = \mu^{e_s}$ and $E_m = \mu^{e_m}$. Thus, $E_c = \mu^{e_c}$ where $e_s$ is shared, $e_m$ is used for embedding the message, and $e_c$ is sent. Preferably, $\mu$ is a power of two.

In an alternative embodiment for performing public key cryptography, the sending and the receiving entities use two keys, i.e., a private key and a public key. While the pair of public and private keys that is used to obtain the cipher point $(X_c, Y_c, Z_c)$ are generated in a conventional way, the pair of public and private keys that is used to obtain the cipher transformation index $E_c$ can be generated using any suitable public key system, i.e., it can be generated using RSA, an elliptic curve method or the like.

The alternative method of performing symmetric, enhanced XZ elliptic curve cryptography with a public key includes the following steps: (a) a sending correspondent and a receiving correspondent selecting and agreeing upon an elliptic curve set $EC^3$ the sending correspondent further establishing a private key pair $(k_{SPr}, e_{SPr})$; and (b) the sending correspondent and the receiving correspondent further agreeing upon a base point $(X_B, Y_B, Z_B) \in EC^3$ and sharing a public key pair $(k_{SPr}(X_B, Y_B, Z_B), E_b^{e_{SPr}})$.

The sending correspondent then performs the following steps: (c) calculating a shared key as $(k_{SPr}(k_{RPr}(X_B, Y_B, Z_B)), (E_b^{e_{RPr}})^{e_{SPr}})$; (d) embedding a first secret message bit string into an elliptic curve message point $(X_m, Y_m, Z_m)$ (e) computing a cipher point $(X_c, Y_c, Z_c)$ as $(X_c, Y_c, Z_c) = (X_m, Y_m, Z_m) + k_{SPr}(k_{RPr}(X_B, Y_B, Z_B))$; (f) embedding a second secret message bit string into a data transformation index $E_m$; (g) transforming the cipher point coordinates $X_c$ and $Z_c$ as $\hat{X}_C = X_C(E_b^{e_{RPr}})^{e_{SPr}}$ and $\hat{Z}_C = Z_C E_m$, respectively; (h) calculating a cipher transformation index $E_c$ as $$E_c = \frac{(E_b^{e_{RPr}})^{e_{SPr}}}{E_m};$$

and (i) sending a set of appropriate bits of $\hat{X}_c$, $\hat{Z}_c$, and $E_c$ to the receiving correspondent.

The receiving correspondent then performs the following steps: (j) calculating the shared key as $(k_{RPr}(k_{SPr}(X_B, Y_B, Z_B)), (E_b^{e_{SPr}})^{e_{RPr}})$; (k) calculating the data transformation index $E_m$ as $$E_m = \frac{(E_b^{e_{RPr}})^{e_{SPr}}}{E_c};$$

(l) calculating the cipher point coordinates $X_c$ and $Z_c$ as $X_C = \hat{X}_C((E_b^{e_{RPr}})^{e_{SPr}})^{-1}$ and $Z_C = \hat{Z}_C E_m^{-1}$, respectively; (m) computing the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$; and (n)

retrieving the first secret message bit string from the elliptic curve message point $(X_B, Y_B, Z_B)$.

As in the previous embodiment, preferably, the shared number $E_b$ and the data transformation index $E_m$ are selected to be powers of a common base $\mu$, i.e., $E_b = \mu^{e_b}$ and $E_m = \mu^{e_m}$. Thus, $E_c = \mu^{e_c}$ where $e_m$ is used for embedding the message and $e_c$ is sent. Preferably, $\mu$ is a power of two.

In conventional elliptic curve cryptography, encryption and decryption, the message data bits are embedded in only the affine x-coordinate $x_m$ of the elliptic curve points. Further, given an elliptic curve defined over $F(p)$ that needs N bits for the representation of its elements, each x-coordinate $x_m$ carries only (N−L) bits of the message data bits. Thus, at least one inversion or division over $F(p)$ (i.e., one modulo p inversion or division) is needed per (N−L)-bit encryption.

In the present method, the encryption of more than (2N−L) bits of the message data is achieved per one inversion or division over $F(p)$, i.e., per one modulo p inversion or division. This is achieved by first defining an elliptic curve group over addition in projective coordinates, which allows the embedding of one part of the message data bit-string in both the X-coordinate and the Z-coordinate of the elliptic curve points, where X and Z are elements of $F(p)$ represented in N-bit strings; and second, transforming the cipher point to an isomorphic curve that is determined by the second part of the message data bit-string. In the present method, the relevant bits of both the X- and Z-coordinates of the transformed cipher point, as well as the bits of the ciphered transformation index $E_C$, are sent to the receiver.

At the receiving entity, the message bits are recovered from X- and Z-coordinates of the cipher point, as well as the bits of the ciphered transformation index $E_C$, which is achieved using one inversion or division over $F(p)$ (i.e., one modulo p inversion or division).

Further, in the present method, an additional projective coordinate is used at the sending and receiving entities to eliminate the inversion or division during each addition and doubling operation of the scalar multiplication. Thus, up to (3N−L) bits of the message data can be encrypted (and subsequently decrypted) using one inversion or division. The use of embedding in the X- and Z-coordinates of an elliptic curve point, combined with the embedding in the transformation index, increases the number of points that satisfy an elliptic curve equation, which can then be used in the corresponding cryptosystem, such that the number of points is proportional to $p^3$ rather than p. Thus, for the same number of embedded bits, a smaller p can be used when embedding in the X- and Z-coordinates, as well as the transformation index, than when embedding only in the x-coordinate. This results in faster implementations and reduced power consumption.

In the method of performing enhanced XZ-elliptic curve cryptography, the steps of embedding include the following steps: (a) defining the respective message bit string as an M-bit string, where M is an integer such that (3N−L)>M>(2N−L), L is an integer, N represents a number of bits used to represent $F(p)$ elements, and $F(p)$ represents a finite field containing the elliptic curve set $EC^3$, where p represents a set of points on $EC^3$; (b) dividing the respective message bit string into three strings $m_1$, $m_2$ and $m_3$, where the length of string $m_1$ is less than or equal to (N−L) bits, the length of string $m_2$ is less than or equal to (N−1) bits, and the length of string $m_3$ is less than or equal to N bits; (c) assigning the value of the bit string $m_3$ to $E_m$; (d) assigning the value of the bit string $m_2$ to Z. by first assigning the value of the bit string $m_2$ to $R_m$, then using a Legendre test to determine if $R_m$ has a square root, and then, if $R_m$ has a square root, setting $Z_m = R_m$ and if $R_m$ does not have a square root, then setting $Z_m = gR_m$, where g is non-quadratic residue in $F(p)$; (e) computing $aZ_m^2$ and $bZ_m^3$, where a and b are selected scalars; (f) assigning the value of the bit string $m_1$ to $X_m$; (g) computing a value T as $T = X_m^3 + (aZ_m^2)X_m + (bZ_m^3)$ and using a Legendre test to determine if T has a square root; and (h) assigning the square root of T to $Y_m$ if T has a square root, and incrementally increasing $X_m$ and returning to step (g) if T does not have a square root.

The Legendre Symbol is used to test whether an element of $F(p)$ has a square root or not, i.e., whether an element is quadratic residue or not. The Legendre Symbol and test are as follows. Given an element of a finite field $F(p)$, such as d, the Legendre symbol is defined as $$\left(\frac{d}{p}\right).$$

In order to test whether d is quadratic residue or not, the Legendre symbol, $$\left(\frac{d}{p}\right),$$

is computed such that:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

In the above, it should be noted that p is usually predetermined prior to encryption, thus the value of g can also be predetermined. When using the embedding method given above, the strings $m_1$, $m_2$ and $m_3$ can be recovered directly from $X_m$, $Z_m$, and $E_m$, respectively. An extra bit is needed to identify whether $R_m$ or $gR_m$ is used for $Z_m$, at the receiver. Therefore, to encode (N−1) message data bits, one needs to send N bits for the Z values.

Any non-quadratic value in $F(p)$ can be used for g. For efficiency, g is chosen to be −1 for $p \equiv 3 \bmod 4$ or when $p = 1 \bmod 4$.

At the receiver, the process is reversed. In the case of g=2, a division by 2 is carried out. It should noted that dividing $R_m$ by two is computed using one modulo addition, since:

$R_m/2 = ((R_m - (R_m) \bmod 2)/2) + (R_m) \bmod 2 * (\frac{1}{2}) \bmod p;$ (i)

$(R_m) \bmod 2$ is the least significant bit of $R_m$; and (ii)

$(\frac{1}{2}) \bmod p = (p+1)/2.$ (iii)

The security of the password protocols depends on the security of the underlying elliptic polynomial cryptography. The security of elliptic polynomial cryptosystems is assessed by both the effect on the solution of the elliptic curve discrete logarithmic problem (ECDLP) and power analysis attacks.

It is well known that the elliptic curve discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_p, y_p) \in EC$, defined in affine coordinates, and a point $(x_Q, y_Q) \in EC$, defined in affine coordinates, determine the integer $k, 0 \leq k \leq \#F$, such that $(x_Q, y_Q) = k(x_p, y_p)$, provided that such an integer exists. In the below, it is assumed that such an integer exists.

Various methods of pre-conditioning the data have been proposed for different requirements. Any scheme which guarantees the uselessness of acquiring a partial message is applicable to the present method. One way to achieve this behavior is through the "All-or-Nothing Transformation" (AONT), which is defined as a keyless transformations that maps a sequence of blocks $B_1$ to another sequence of blocks $B_2$ such that a missing block of $B_2$ will totally prevent reproducing $B_1$ partially or fully, or obtaining any useful information about it.

Another method of achieving this is to multiply the message data as a vector by a matrix T in order to obtain a transformed vector as follows:

$$\overline{m}_1 = T\overline{m}_o, \qquad (75)$$

where T is of size $S_t \times S_t$ elements, $\overline{m}_o$ and $\overline{m}_t$ are the original and the transformed message data vector, respectively, which are of length $S_t$ elements, and where bit length $S_t \geq (3N-L)$. Then, $\overline{m}_t$ would be used for embedding instead of $\overline{m}_o$. With the matrix T chosen properly, the partial knowledge of $\overline{m}_t$ is not enough to obtain any useful part of $\overline{m}_o$.

The most well-known attack used against the ECDLP is the Pollard ρ-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

Projective coordinates can also be used by the sending correspondent and the receiving correspondent to embed extra message data bits in the projective coordinate, wherein the addition of the corresponding elliptic points is defined in (nx+ny+3) dimensional space where there are (nx+1) x-coordinates, (ny+1) y-coordinates and one projective coordinate.

The equations for the addition rule can be obtained by using the elliptic polynomial equation with (nx+1) x-coordinates and (nx+1) y-coordinates in projective coordinates and substituting a straight line equation to obtain a cubic equation in terms of one of the x-coordinates. This cubic equation can be used to identify the third point of intersection between a straight line and the elliptic polynomial in (nx+ny+3) dimensions given two other intersection points. This third point of intersection is used to identify the sum of the given two points.

For the present method, the ECDLP in $EC^3$ can be stated as follows: given a point $(X_p, Y_p, Z_p) \in EC^3$ and a point $(X_Q, Y_Q, Z_Q) \in EC^3$ defined in projective coordinates, find k such that $(X_Q, Y_Q, Z_Q) = k(X_p, Y_p, Z_p)$. In $EC^3$, the modified Pollard ρ-method can be formulated as follows. Find two points:

$$(X_i, Y_i, Z_i) = A_i(X_Q, Y_Q, Z_Q) + B_i k(X_p, Y_p, Z_p) \text{ and}$$

$$(X_j, Y_j, Z_j) = A_j(X_Q, Y_Q, Z_Q) + B_j k(X_p, Y_p, Z_p)$$

such that $(X_i, Y_i, Z_i) = (X_j, Y_j, Z_j)$, and hence $$k = \frac{A_i + A_j}{B_i + B_j},$$

and given that all the points are members of $EC^3$.

it is clear that the complexity of the Pollard ρ-method in $EC^3$ is not less than the complexity of the Pollard ρ-method in $EC^2$ for the same group order. It should also be noted that since $EC^3$ encryption and $EC^2$ encryption are generated by the same elliptic curve, all the analysis of the security of $EC^2$ cryptography will be applicable to the analysis of the security of $EC^3$ cryptography. Moreover, the introduction of the isomorphic transformation indexed by the three transformation indices has an effect of hiding the original curve on which data has been originally ciphered, which makes cryptanalysis even harder.

The third projection described above can be used to enhance the more general elliptic polynomial cryptography, provided that the first projection has been applied to the polynomial. An alternative form of the elliptic polynomial equation with more than one x-coordinate and one or more y-coordinates is used, with the equation following these conditions: some of the variables (i.e., the y-coordinates) have a maximum degree of two; other variables (i.e., the x-coordinates) have a maximum degree of three; a monomial cannot contain an x-coordinate variable and a y-coordinate variable; all monomials that contain x-coordinates must have a degree of three or less; and all monomials that contain y-coordinates must have a degree of two.

Letting $S_{nx}$ represent the set of numbers between 0 and n in x (i.e., $S_{nx}\{0, \ldots, nx\}$) and letting $S_{ny}$ represent the set of numbers between 0 and n in y (i.e., $S_{ny}=\{0, \ldots, ny\}$), and letting (nx+ny) be greater than or equal to one, then, given a finite field F, the following equation defined over F is one example of the polynomial equation described above:

$$\sum_{k \in S_{ny}} a_{1k} y_k^2 + \sum_{k,l \in S_{ny}, l \neq k} a_{2kl} y_k y_l = \sum_{l \in S_{nx}} b_{1l} x_l^3 + \sum_{l,k \in S_{nx}, l \neq k} b_{2lk} x_l^2 x_k + \qquad (76)$$

$$\sum_{l,k,m \in S_{nx}, l \neq k \neq m} b_{3lkm} x_l x_k x_m + \sum_{l,k \in S_{nx}} b_{4lk} x_l x_k + \sum_{k \in S_{nx}} b_{5k} x_k + b_6,$$

where $a_{1l}, a_{2kl}, b_{1l}, b_{2lk}, b_{3lkm}, b_{4lk}, b_{5l}, b_6 \in F$.

By applying the first projection, given by $$y_i = \frac{Y_i}{Z^{\frac{3}{2}}}$$

and $$x_i = \frac{X_i}{Z}$$

for all i, equation (76) becomes:

$$\sum_{k \in S_{ny}} a_{1k} Y_k^2 E_s^3 + \sum_{k,l \in S_{ny}, l \neq k} a_{2kl} Y_k Y_l E_s^3 = \sum_{l \in S_{nx}} b_{1l} X_l^3 E_s^3 + \qquad (77)$$

$$\sum_{l,k \in S_{nx}, l \neq k} b_{2lk} X_l^2 X_k E_s^3 + \sum_{l,k,m \in S_{nx}, l \neq k \neq m} b_{3lkm} X_l X_k X_m E_s^3 +$$

$$\sum_{l,k \in S_{nx}} b_{4lk} X_l X_k Z E_s^2 E_m E_c + \sum_{k \in S_{nx}} b_{5k} X_k Z^2 E_s E_m^2 E_c^2 + b_6 Z^3 E_m^3 E_c^3.$$

Then, the following substitutions can be applied:

$$\hat{Y}_i = Y_i E_s^{\frac{3}{2}};\ \hat{X}_i = X_i E_s;\ \hat{Z} = Z E_m;\ \hat{b}_{4lk} = b_{4lk} E_c;\ \hat{b}_{5l} = b_{5l} E_c^2;\ \hat{b}_{6l} = b_{6l} E_c^3,$$

for all i, l, k, and m, while $a_{1l}, a_{2kl}, b_{1l}, b_{2lk}, b_{3lkm}$ remain unchanged. The resulting equation is as follows:

$$\sum_{k \in S_{ny}} a_{1k} \hat{Y}_k^2 + \sum_{k,l \in S_{ny}, l \neq k} a_{2kl} \hat{Y}_k \hat{Y}_l = \qquad (78)$$

$$\sum_{l \in S_{nx}} b_{1l} \hat{X}_l^3 + \sum_{l,k \in S_{nx}, l \neq k} b_{2lk} \hat{X}_l^2 \hat{X}_k + \sum_{l,k,m \in S_{nx}, l \neq k \neq m} b_{3lkm} \hat{X}_l \hat{X}_k \hat{X}_m +$$

$$\sum_{l,k \in S_{nx}} \hat{b}_{4lk} \hat{X}_l \hat{X}_k \hat{Z} + \sum_{k \in S_{nx}} \hat{b}_{5k} \hat{X}_k \hat{Z}^2 + \hat{b}_6 \hat{Z}^3,$$

which is isomorphic to the polynomial described above. Thus, any point on one of these curves can be transformed to an isomorphic point on another curve. Symmetric key cryptography, public key cryptography and digital signatures can then be applied in the same manner described above.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

it is to be understood that the present invention is not limited to the embodiments described above, but encompasses any and all embodiments within the scope of the following claims.

We claim:

1. A computerized method of performing XZ-elliptic curve cryptography, comprising the steps of:
   (a) a sending correspondent and a receiving correspondent selecting and agreeing upon an elliptic curve set $EC^3$;
   (b) the sending correspondent and the receiving correspondent further agreeing upon a random scalar k and a random shared secret key for communication $E_s$, and agreeing upon a base point $(X_B, Y_B, Z_B) \in EC^3$;
   the sending correspondent then performs the following steps:
   (c) embedding a first secret message bit string into an elliptic curve message point $(X_m, Y_m, Z_m)$;
   (d) computing a scalar multiplication between the base point $(X_B, Y_B, Z_B)$ and the scalar k as $(X_{Bk}, Y_{Bk}, Z_{Bk}) = k(X_B, Y_B, Z_B)$;
   (e) computing a cipher point $(X_c, Y_c, Z_c)$ as $(X_c, Y_c, Z_c) = (X_m, Y_m, Z_m) + k(X_B, Y_B, Z_B)$;
   (f) embedding a second secret message bit string into a data transformation index $E_m$;
   (g) transforming the cipher point coordinates $X_c$ and $Z_c$ as $\hat{X}_C = X_C E_s$ and $\hat{Z}_C = Z_C E_m$, respectively;
   (h) calculating a cipher transformation index $E_c$ as $$E_c = \frac{E_s}{E_m};$$

(i) sending a set of appropriate bits of $\hat{X}_c$, $\hat{Z}_c$, and $\hat{E}_c$ to the receiving correspondent;
   the receiving correspondent then performs the following steps:
   (j) calculating the data transformation index $E_m$ as $$E_m = \frac{E_s}{E_c};$$

(k) calculating the cipher point coordinates $X_c$ and $Z_c$ as $X_C = \hat{X}_C E_s^{-1}$ and $Z_C = \hat{Z}_C E_m^{-1}$, respectively;
   (l) computing a scalar multiplication between the base point $(X_B, Y_B, Z_B)$ and the scalar k as $(X_{Bk}, Y_{Bk}, Z_{Bk}) = k(X_B, Y_B, Z_B)$;
   (m) computing the elliptic curve message point $(X_m, Y_m, Z_m)$ as $(X_m, Y_m, Z_m) = (X_c, Y_c, Z_c) - k(X_B, Y_B, Z_B)$; and
   (n) retrieving the first secret message bit string from the elliptic curve message point $(X_m, Y_m, Z_m)$.

2. The computerized method of performing XZ-elliptic curve cryptography as recited in claim 1, wherein each said step of embedding includes the steps of:
   (a) defining the respective message bit string as an M-bit string, wherein M is an integer such that $(3N-L) > M > (2N-L)$, where L is an integer, N represents a number of bits used to represent F(p) elements, F(p) representing a finite field containing the elliptic curve set $EC^3$, wherein p represents a set of points on $EC^3$;
   (b) dividing the respective message bit string into three strings $m_1$, $m_2$ and $m_3$, wherein the length of string $m_1$ is less than or equal to (N–L) bits, the length of string $m_2$ is less than or equal to (N–1) bits, and the length of string mg is less than or equal to N bits;
   (c) assigning the value of the bit string $m_3$ to $E_m$;
   (d) assigning the value of the bit string $m_2$ to $Z_m$ by first assigning the value of the bit string $m_2$ to $R_m$, then using a Legendre test to determine if $R_m$ has a square root, and then, if $R_m$ has a square root, setting $Z_m = R_m$ and if $R_m$ does not have a square root, then setting $Z_m = g R_m$, wherein g is non-quadratic residue in F(p);
   (e) computing $a Z_m^2$ and $b Z_m^3$, wherein a and b are selected scalars;
   (f) assigning the value of the bit string $m_1$ to $X_m$;
   (g) computing a value T as $T = X_m^3 + (a Z_n^2) X_m + (b Z_m^3)$ and using a Legendre test to determine if T has a square root; and
   (h) assigning the square root of T to $Y_m$, if T has a square root, and incrementally increasing $X_m$ and returning to step (g) if T does not have a square root.

3. The computerized method of performing XZ-elliptic curve cryptography as recited in claim 2, wherein p is selected prior to encryption.

4. The computerized method of performing XZ-elliptic curve cryptography as recited in claim 3, wherein g is selected to be −1 if p≡3 mod 4 or p≡1 mod 4.

5. The computerized method of performing XZ-elliptic curve cryptography as recited in claim 4, wherein the shared secret key for communication $E_s$ and the data transformation index $E_m$ are selected to be powers of a common base μ.

6. The computerized method of performing XZ-elliptic curve cryptography as recited in claim 5, wherein the common base μ is selected to be a power of two.

7. A computerized method of performing XZ-elliptic curve cryptography with a public key, comprising the steps of:

(a) a sending correspondent and a receiving correspondent selecting and agreeing upon an elliptic curve set $EC^3$, the sending correspondent further establishing a private key pair $(k_{SPr}, e_{SPr})$;

(b) the sending correspondent and the receiving correspondent further agreeing upon a base point $(X_B, Y_B, Z_B) \in EC^3$ and sharing a public key pair $(k_{SPr}(X_B, Y_B, Z_B), E_b^{e_{SPr}})$;

the sending correspondent then performs the following steps:

(c) calculating a shared key as $(k_{SPr}(k_{RPr}(X_B, Y_B, Z_B)), (E_b^{e_{RPr}})^{e_{SPr}})$ (d) embedding a first secret message bit string into an elliptic curve message point $(X_m, Y_m, Z_m)$;

(e) computing a cipher point $(X_c, Y_c, Z_c)$ as $(X_c, Y_c, Z_c) = (X_m, Y_m, Z_m) + k_{SPr}(k_{RPr}(X_B, Y_B, Z_B))$;

(f) embedding a second secret message bit string into a data transformation index $E_m$;

(g) transforming the cipher point coordinates $X_c$ and $Z_c$ as $\hat{X}_C = X_C(E_b^{e_{RPr}})^{e_{SPr}}$ and $\hat{Z}_C = Z_C E_m$, respectively;

(h) calculating a cipher transformation index $E_c$ as $$E_c = \frac{(E_b^{e_{RPr}})^{e_{SPr}}}{E_m};$$

(i) sending a set of appropriate bits of $\hat{X}_c$, $\hat{Z}_c$ and $E_c$ to the receiving correspondent;

the receiving correspondent then performs the following steps:

(j) calculating the shared key as $(k_{RPr}(k_{SPr}(X_B, Y_B, Z_B)), (E_b^{e_{SPr}})^{e_{RPr}})$;

(k) calculating the data transformation index $E_m$ as $$E_m = \frac{(E_b^{e_{RPr}})^{e_{SPr}}}{E_c};$$

(l) calculating the cipher point coordinates $X_c$ and $Z_c$ as $X_C = \hat{X}_C(E_b^{e_{RPr}})^{e_{SPr}})^{-1}$ and $Z_C = \hat{Z}_C E_m^{-1}$, respectively;

(m) computing the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$; and (n) retrieving the first secret message bit string from the elliptic curve message point $(X_m, Y_m, Z_m)$.

8. The computerized method of performing XZ-elliptic curve cryptography with a public key as recited in claim 7, wherein the step of embedding includes the steps of:

(a) defining the respective message bit string as an M-bit string, wherein M is an integer such that (3N−L)>M>(2N−L), where L is an integer, N represents a number of bits used to represent F(p) elements, F(p) representing a finite field containing the elliptic curve set $EC^3$, wherein p represents a set of points on $EC^3$;

(b) dividing the respective message bit string into three strings $m_1$, $m_2$ and $m_3$, wherein the length of string $m_1$ is less than or equal to (N−L) bits, the length of string $m_2$ is less than or equal to (N−1) bits, and the length of string in is less than or equal to N bits;

(c) assigning the value of the bit string $m_3$ to $E_m$;

(d) assigning the value of the bit string $m_2$ to $Z_m$ by first assigning the value of the bit string $m_2$ to $R_m$, then using a Legendre test to determine if $R_m$ has a square root, and then, if $R_m$ has a square root, setting $Z_m = R_m$ and if $R_m$ does not have a square root, then setting $Z_m = gR_m$, wherein g is non-quadratic residue in F(p);

(e) computing $aZ_m^2$ and $bZ_m^3$, wherein a and b are selected scalars;

(f) assigning the value of the bit string $m_1$ to $X_m$;

(g) computing a value T as $T = X_m^3 + (aZ_m^2)X_m + (bZ_m^3)$ and using a Legendre test to determine if T has a square root; and (h) assigning the square root of T to $Y_m$ if T has a square root, and incrementally increasing $X_m$ and returning to step (g) if T does not have a square root.

9. The computerized method of performing XZ-elliptic curve cryptography with a public key as recited in claim 8, wherein p is selected prior to encryption.

10. The computerized method of performing XZ-elliptic curve cryptography with a public key as recited in claim 9, wherein g is selected to be −1 if p≡3 mod 4 or p≡1 mod 4.

11. The computerized method of performing XZ-elliptic curve cryptography with a public key as recited in claim 10, wherein the shared number $E_b$ and the data transformation index $E_m$ are selected to be powers of a common base μ.

12. The computerized method of performing XZ-elliptic curve cryptography with a public key as recited in claim 11, wherein the common base μ is selected to be a power of two.

13. A system for performing XZ-elliptic curve cryptography, wherein a sending correspondent and a receiving correspondent select and agree upon an elliptic curve set $EC^3$, wherein the sending correspondent further establishes a private key pair $(k_{SPr}, e_{SPr})$, the sending correspondent and the receiving correspondent further agreeing upon a base point $(X_B, Y_B, Z_B) \in EC$ and sharing a public key pair $(k_{SPr}(X_B, Y_B, Z_B), E_b^{e_{SPr}})$, the system comprising:

a processor;

computer readable memory coupled to the processor;

a user interface coupled to the processor;

a display coupled to the processor;

software stored in the memory and executable by the processor, the software having:

means for calculating a shared key as $(k_{SPr}(k_{RPr}(X_B, Y_B, Z_B)), (E_b^{e_{RPr}})^{e_{SPr}})$ at the sending correspondent;

means for embedding a first secret message bit string into an elliptic curve message point $(X_m, Y_m, Z_m)$ at the sending correspondent;

means for computing a cipher point $(X_c, Y_c, Z_c)$ as $(X_c, Y_c, Z_c) = (X_m, Y_m, Z_m) + k_{SPr}(k_{RPr}(X_B, Y_B, Z_B))$ at the sending correspondent;

means for embedding a second secret message bit string into a data transformation index $E_m$, at the sending correspondent;

means for transforming the cipher point coordinates $X_c$ and $Z_c$ as $\hat{X}_C = X_C(E_b^{e_{RPr}})^{e_{SPr}}$ and $\hat{Z}_C = Z_C E_m$, respectively, at the sending correspondent;

means for calculating a cipher transformation index $E_c$ as $$E_c = \frac{(E_b^{e_{RPr}})^{e_{SPr}}}{E_m}$$

at the sending correspondent;
means for sending a set of appropriate bits of $\hat{X}_c$, $\hat{Z}_c$, and $E_c$, to the receiving correspondent;
means for calculating the shared key as $(k_{RPr}(k_{SPr}(X_B,Y_B,Z_B)),(E_b^{e_{SPr}})^{e_{RPr}})$ at the receiving correspondent;
means for calculating the data transformation index $E_m$ as $$E_m = \frac{(E_b^{e_{RPr}})^{e_{SPr}}}{E_c}$$

at the receiving correspondent;
means for calculating the cipher point coordinates $X_c$ and $Z_c$ as $X_C = \hat{X}_C(E_b^{e_{RPr}})^{e_{SPr}})^{-1}$ and $Z_C = \hat{Z}_C E_m^{-1}$, respectively, at the receiving correspondent;
means for computing the elliptic curve message point $(X_m, Y_m, Z_m)$ as $(X_m, Y_m, Z_m) = (X_c, Y_c, Z_c) - k_{RPr}(k_{SPr}(X_B, Y_B, Z_B))$ at the receiving correspondent; and
means for retrieving the first secret message bit string from the elliptic curve message point $(X_m, Y_m, Z_m)$.

\* \* \* \* \*